United States Patent
Murali et al.

(10) Patent No.: US 12,554,498 B2
(45) Date of Patent: Feb. 17, 2026

(54) QUANTUM COMPUTER WITH A PRACTICAL-SCALE INSTRUCTION HIERARCHY

(71) Applicant: Microsoft Technology Licensing, LLC, Redmond, WA (US)

(72) Inventors: Prakash Murali, Cambridge (GB); Justin Wayne Hogaboam, Redmond, WA (US); Matthias Troyer, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/656,902

(22) Filed: May 7, 2024

(65) Prior Publication Data
US 2025/0348314 A1    Nov. 13, 2025

(51) Int. Cl.
  *G06F 9/30*     (2018.01)
  *G06F 8/40*     (2018.01)
  *G06N 10/80*    (2022.01)

(52) U.S. Cl.
  CPC ............. *G06F 9/3017* (2013.01); *G06F 8/40* (2013.01); *G06N 10/80* (2022.01)

(58) Field of Classification Search
  CPC .......... G06F 9/3017; G06F 8/40; G06N 10/80
  See application file for complete search history.

(56) References Cited

U.S. PATENT DOCUMENTS

| | | | | |
|---|---|---|---|---|
| 11,494,681 | B1* | 11/2022 | Peterson | G06F 15/16 |
| 2021/0173660 | A1* | 6/2021 | Hogaboam | G06F 9/3851 |
| 2021/0182724 | A1* | 6/2021 | Zou | G06N 10/20 |
| 2022/0164501 | A1* | 5/2022 | Nosanow | G06N 10/20 |
| 2023/0289638 | A1* | 9/2023 | Peterson | G06N 10/20 |
| 2025/0021849 | A1* | 1/2025 | Daraeizadeh | G06N 10/00 |

FOREIGN PATENT DOCUMENTS

GB        2628791 A  * 10/2024  ............. G06N 10/20

OTHER PUBLICATIONS

Beverland, ME et al. Assessing requirements to scale to practical quantum advantage. arXiv preprint arXiv:2211.07629, Nov. 2022, [retrieved on May 19, 2025]. Retrieved from the Internet <URL: https://arxiv.org/pdf/2211.07629>.*

* cited by examiner

Primary Examiner — Shawn Doman
(74) Attorney, Agent, or Firm — Cantor Colburn LLP; Stephen A Wight

(57) ABSTRACT

Aspects of the disclosure include configuring a hierarchy of instructions resulting in execution on a quantum circuit, where the hierarchy of instructions comprise physical device operations, micro operations, qubit operations, and instruction set architecture (ISA) operations. Aspects include translating from the ISA operations to the qubit operations, from the qubit operations to the micro operations, and from the micro operations to the physical device operations. Aspects include causing execution of the physical device operations on the quantum circuit.

17 Claims, 14 Drawing Sheets

3. Turn on stabilizer measurements in the column patch and the logical qubits using Stabilize micro operations on each.

4. Split Q(0,0), Q(0,1) and perform required classical postprocessing.

Logical qubit measurements to physical loop sequences

Each logical qubit state is encoded in patches of physical qubits.

Each logical qubit measurement consists of multiple steps of physical loops on many qubits Error correction codes needs to be constantly running, even on idle qubits.

Logical qubit measurements

MXX 3,5
MZZ 4,5
MZ 5

MYX 1,3
MZZ 1,3
MY 1

MX 2

MZ 3

Each logical measurement corresponds to multiple steps of 100s of parallel joint measurement instructions

Physical loops

Step 0
Z(13,5)Z(14,5)
Z(11,4)Z(12,4)
Z(9,3)Z(10,3)
Z(8,2)Z(7,2)
Z(12,6)Z(11,6)
...

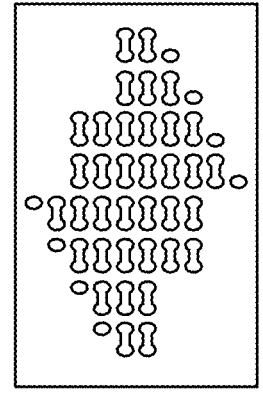

FIG. 12B

QUANTUM COMPUTER WITH A PRACTICAL-SCALE INSTRUCTION HIERARCHY

The subject disclosure relates to quantum circuits, and particularly to a quantum computer with a practical-scale instruction hierarchy.

A quantum computer is a physical machine configured to execute logical operations based on or influenced by quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. Such problems include computer modeling of natural and synthetic quantum systems, predicting the behavior of new molecules and materials, integer factorization, and machine learning. Furthermore, it has been predicted that continued miniaturization of conventional computer logic structures will ultimately lead to the development of nanoscale logic components that exhibit quantum effects and should therefore be addressed according to quantum-computing principles.

Different types of quantum computers base their operation on different quantum-mechanical phenomena. A "topological" quantum computer is a quantum computer whose operation is based on a non-Abelian topological phase of matter that may support "braidable" quasiparticles. This type of quantum computer is expected to be less prone to the issue of quantum decoherence than other types of quantum computers, and may therefore serve as an efficient platform to implement fault-tolerant quantum computing.

SUMMARY

Embodiments of the present invention are directed to methods for providing a quantum computer with a practical-scale instruction hierarchy. A non-limiting example method includes configuring a hierarchy of instructions resulting in execution on a quantum circuit, where the hierarchy of instructions comprise physical device operations, micro operations, qubit operations, and instruction set architecture (ISA) operations. The method includes causing translation from the ISA operations to the qubit operations, from the qubit operations to the micro operations, and from the micro operations to the physical device operations. The method includes causing execution of the physical device operations to realize the computations desired in the quantum circuit.

The above features and advantages, and other features and advantages of the disclosure are readily apparent from the following detailed description when taken in connection with the accompanying drawings. This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 12B depicts translating qubit micro operations to physical device operations from a logical qubit aspect in accordance with one or more embodiments.

Figure 1:
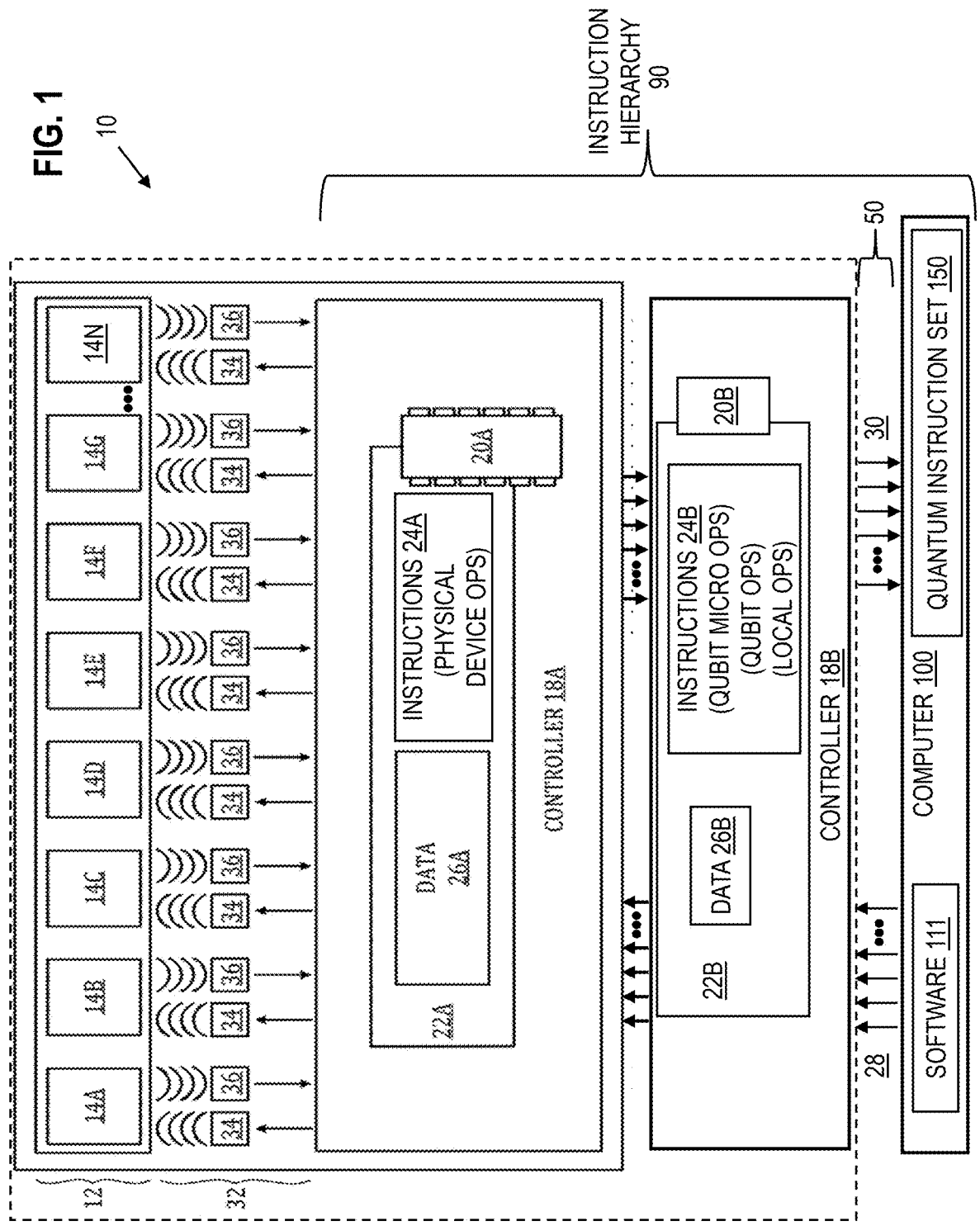
FIG. 1 depicts an example quantum computer configured to execute quantum-logic operations in accordance with one or more embodiments.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number corresponds to the figure in which its element is first illustrated.

DETAILED DESCRIPTION

In accordance with one or more embodiments, a system, a method, a classical computer coupled to a quantum computer, and/or a quantum computer are configured and arranged to provide a practical-scale instruction hierarchy executed on quantum circuits of a quantum computer.

Quantum computers are expected to have immense societal impact by enabling chemistry and material science computations that are beyond the scope of classical computers. As some possibilities, these applications may utilize or require systems that have a million physical qubits and need to sustain over a hundred billion logical operations on these qubits. In some cases, existing quantum computer architectures may be designed without considering the requirements of large practical applications and therefore suffer from scaling bottlenecks. One or more embodiments disclose a quantum computer with a novel instruction hierarchy that offers scalable executions for practical-scale applications. Using a set of appropriately chosen instruction translation levels, this instruction set hierarchy/architecture minimizes the bandwidth required to issue instructions from software to physical qubits and minimizes the number of measurements that are exposed back to software, according to one or more embodiments. The instruction hierarchy offers an efficient low-power instruction decoding in a warm region of the quantum computer, while being easily programmable and controllable from software. Further, the instruction set offers the ability to compress instructions at different levels and further minimize bandwidth requirements. This system constitutes one of the architectural foundations of quantum computing technology using topological qubits but is also applicable to other qubit technologies.

Quantum computers are likely to have an impact on applications in chemistry, material science, and fundamental physics simulations. Systems required to enable these applications should have upwards of a few hundred qubits for the earliest demonstrations and several thousand qubits for practical-scale computations. These applications may include several million to billions of operations, which are to be executed with very low error rates to enable accurate computations. Further, it is desired that applications should ideally execute in a time frame, of at most, a few weeks that are reasonable for practical use cases. Together, these requirements of qubit scale, instruction fidelity, and speed constitute fundamental design constraints that are utilized to achieve useful quantum computers.

For quantum computing, one or more embodiments provide an instruction set that caters to the requirements of practical scale applications to set the stage for rapid hardware and software development. In classical computers, the instruction set architecture is the interface between hardware and software. Once an appropriate instruction set is chosen, hardware and software can be developed independently and then be put together to achieve the desired application executions.

The following provides example requirements of a practical scale quantum instruction set, which include an ability to support logical qubits, scalable input/output (I/O), power-efficiency, and a simplified control stack design.

Ability to support logical qubits: To support practical scale algorithms such as quantum chemistry, systems require several thousand logical qubits. These logical qubits use quantum error correction (QEC) schemes that use collections of physical qubits to reduce the occurrence of errors. Quantum instruction sets should be able to efficiently implement QEC using physical qubits. At the same time, quantum instruction sets should be sufficiently abstracted away from both physical qubit and QEC details in order to provide programmability across a wide range of devices, in accordance with one or more embodiments.

Scalable I/O: QEC is expensive in terms of the number of physical qubits required to implement each logical qubit. Therefore, practical quantum instruction sets should be capable of executing operations across millions of physical qubits. Issuing operations and processing measurements for each physical qubit from software is prohibitive in terms of the control bandwidth required between the classical software plane and the quantum plane. Similarly, issuing operations in terms of logical qubits and directly translating them into physical operations vastly increases the complexity of the control hardware. One or more embodiments provide a quantum instruction set that strikes a balance between these two scenarios and minimizes the implementation overheads of classical to quantum I/O.

Power efficiency: Another metric for evaluating a quantum instruction set is the power required to implement the control hardware. The control hardware should be able to decode the instructions from a room temperature software controller, execute these instructions on the qubits, extract measurement information, and relay the measurement information back to software. One or more embodiments provide an instruction set and translation levels that offer low-power control of the device.

Simplify control stack design: Common QEC schemes such as the surface code only provide local instructions (nearest-neighbor). However, a variety of operations exist on such codes where the number of physical operations required to execute a local logical operation can be very high or even dependent on the instruction operands. One or more embodiments provide a quantum instruction set where local operations can be supported with fixed control overheads per operation in order to simplify the control stack design.

In the disclosure, one or more embodiments design a set of quantum instruction translation levels that is applicable across different qubit technologies and QEC schemes. The proposed quantum instruction hierarchy allows a performance and power efficient implementation for practical scale by minimizing control and measurement bandwidth, offers low-power decoding in the control plane, and offers the ability to further reduce control requirements through instruction compression.

A few definitions are provided below.

Logical qubit versus physical qubit: Resource estimation using practical applications shows that systems with logical qubits are required to obtain sufficient operational quality. Across qubit technologies that are currently being explored, physical qubit error rates are likely to be at most $10^{-4}$ for technologies such as superconducting and trapped ion qubits, and at most $10^{-6}$ for topological qubits. Since applications require operations error rates that are several orders of magnitude below $10^{-4}$, quantum error correction (QEC) is a considerable component of the quantum stack. Like classical error correction codes that use multiple physical bits to encode a single bit of information, QEC schemes allow one to construct a logical qubit where quantum information is redundantly encoded using multiple physical qubits. QEC schemes use carefully designed parity measurement operations to detect and correct errors that occur in these logical qubits and offer error rates that are below the error rates of the basic physical operations.

Instruction set architecture: The instruction set architecture (ISA) is the hardware-software interface. As long as hardware faithfully implements the ISA and software is used to express programs in terms of the ISA operations, one skilled in the art can assemble hardware and software and expect correct executions of a program. Like classical computers, quantum computers include a set of software components such as the compiler and runtime that drive the execution of a program and hardware that implements the software instructions. Quantum hardware could include instruction decoding and issue, instruction execution and measurement processing, and implementation of the logical qubit and components such as magic state distillation and the low-level qubit control systems. The ISA draws the boundary between these software and hardware components.

Instruction hierarchy: For quantum computers, embodiments require not just an ISA, but also clarity on how the ISA level instructions translate down into lower-level operations. The present disclosure uses the term quantum instruction hierarchy or simply instruction hierarchy to denote the overall set of operations supported in the system at various levels of abstraction, including the ISA operations at the highest level to device control operations at the lowest level.

Quantum computing can utilize methods that suppress errors in faulty qubits. Quantum error correction is a broad class of techniques that encode "logical" qubits and gates in a subspace of the Hilbert space formed by many more "physical" qubits and gates. The structure of a quantum code has an influence on how logical gates are enacted on the physical qubits, and hence the total size and execution time of a quantum computation.

Figure 4:
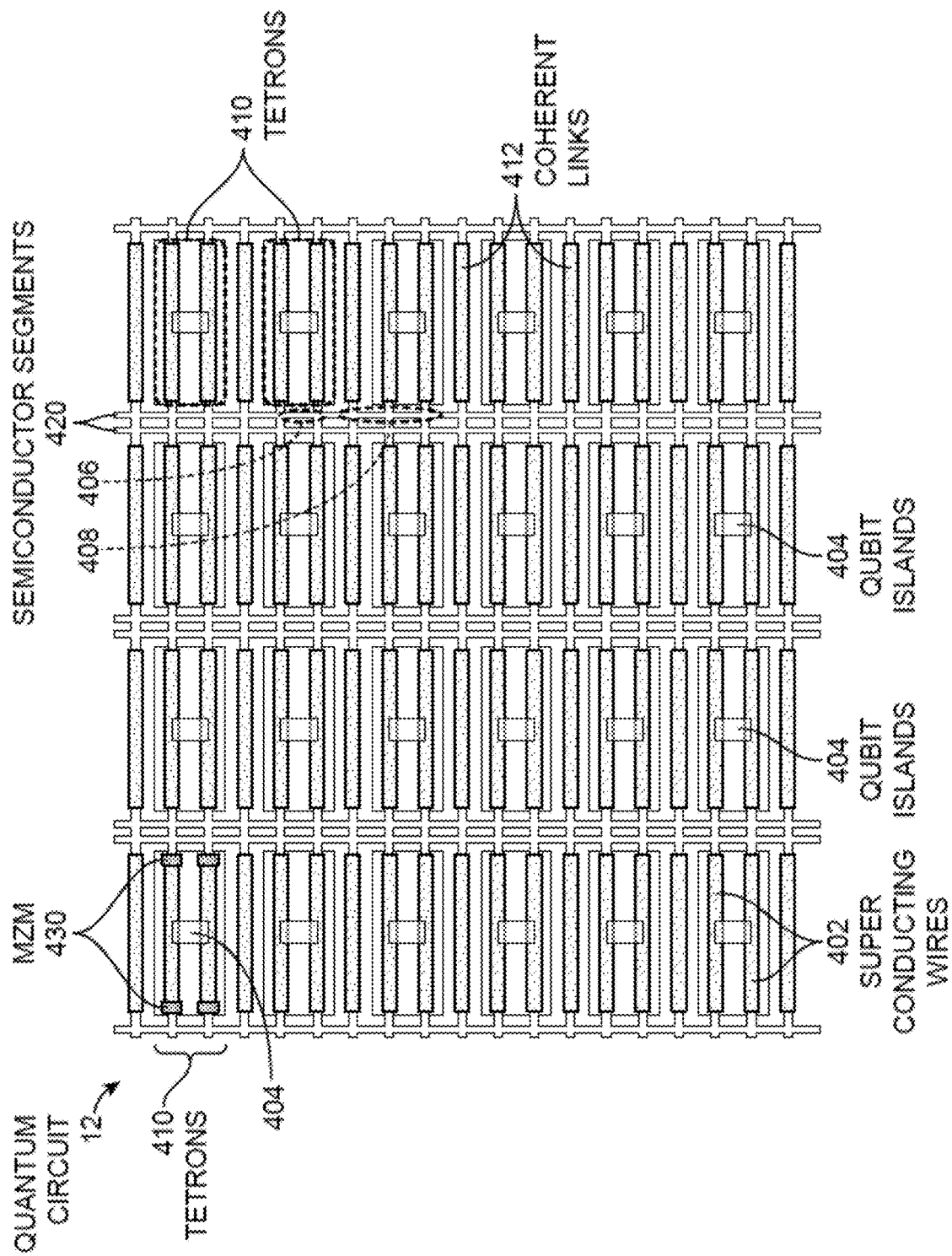
FIG. 4 depicts a layout of a quantum circuit in accordance with one or more embodiments.

Example Quantum Computer Architecture: FIG. 1 illustrates an example quantum computer 10 configured to execute quantum-logic operations. While conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes at least one quantum circuit 12 having an array of physical qubits 14A, 14B, and 14C-14N, where N is the last number of qubits. The qubits 14A-14N can be referred to collectively as qubits 14. The quantum circuit 12 of the array of qubits 14 can be arranged in a lattice structure as depicted in FIG. 4.

The qubits 14 of the quantum circuit 12 take various forms, depending on the desired architecture of the quantum computer 10. While this disclosure relates to qubits embodied as quasiparticles in a non-Abelian topological phase, a qubit alternatively can include: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples.

More generally, each qubit 14 can include any particle or system of particles that can exist in two or more discrete quantum states that can be measured and manipulated experimentally. For instance, a qubit may be implemented in the plural processing states corresponding to different modes of light propagation through linear optical elements (e.g., mirrors, beam splitters and phase shifters), as well as in states accumulated within a Bose-Einstein condensate.

Figure 2:
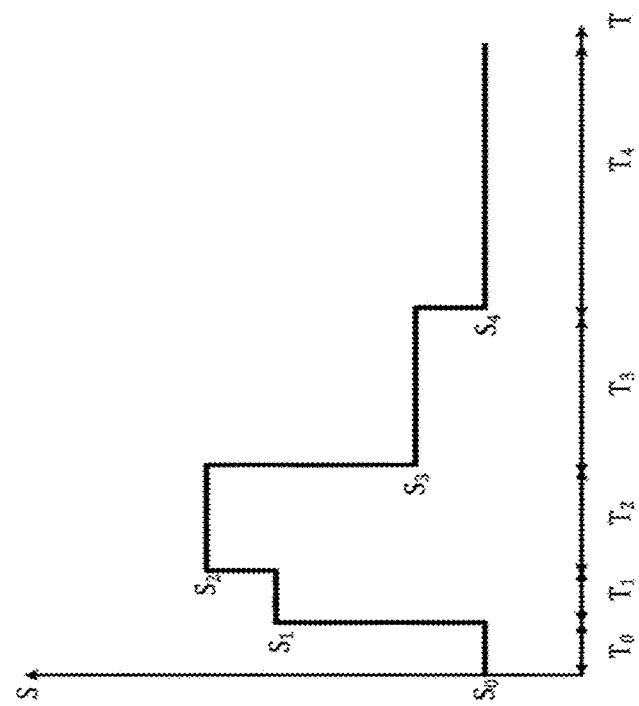
FIG. 2 depicts an illustration of a Bloch sphere that provides a graphical description of some quantum mechanical aspects of an individual qubit in accordance with one or more embodiments.

FIG. 2 is an illustration of a Bloch sphere 16 that provides a graphical description of some quantum mechanical aspects of an individual qubit 14. In this description, the north and south poles of the Bloch sphere correspond to the standard basis vectors |0> and |1>, respectively. The set of points on the surface of the Bloch sphere comprise all possible pure states |ψ> of the qubit, while the interior points correspond to all possible mixed states. A mixed state of a given qubit may result from decoherence, which may occur because of undesirable coupling to external degrees of freedom.

Referring to FIG. 1, quantum computer 10 includes a controller 18A and a controller 18B. The controller 18A includes at least one processor 20A and associated computer memory 22A. Similarly, the controller 18B includes at least one processor 20B and associated computer memory 22B. The processor 20B of the controller 18B can be coupled operatively to peripheral componentry, such as network componentry, to enable the quantum computer 10 to be operated remotely. The processor 20A of the controller 18A and the processor 20B of the controller 18B can take the form of a central processing unit (CPU), a graphics processing unit (GPU), an embedded controller, or the like. As such, the controller can include classical electronic componentry including logic circuitry. The terms "classical" and "non-quantum" are applied herein to any component that can be modeled accurately as an ensemble of particles without considering the quantum state of any individual particle. Classical electronic components include integrated, micro-lithographed transistors, resistors, and capacitors, for example. The computer memory 22A can be configured to hold program instructions 24A that cause the processor 20A to execute any function or process of the controller 18A. The program instructions 24A can include physical device operations (ops). The computer memory 22A can also be configured to hold additional data 26A. The computer memory 22BA can be configured to hold program instructions 24B that cause the processor 20B to execute any function or process of the controller 18B. The program instructions 24B can include qubit micro operations, qubit operations, and local operations. The computer memory 22B can also be configured to hold additional data 26B. In examples in which quantum circuit 12 is a low-temperature or cryogenic device, the controller 18A can include control componentry operable at low or cryogenic temperatures, for example, a field-programmable gate array (FPGA) operated at 77 kelvin (K). In such examples, the low-temperature control componentry can be coupled operatively to interface componentry operable at normal temperatures. Although the controller 18B may include control componentry operable at low or cryogenic temperatures in one or more embodiments, the controller 18B may operate at a temperature warmer than low or cryogenic temperatures but cooler than ambient temperature (or room temperature). In one or more embodiments, the controller 18B may operate at ambient temperatures (or room temperature). In one or more embodiments, while the controller 18A operates at low or cryogenic temperatures, the controller 18 may operate at temperatures warmer than the low or cryogenic temperatures of controller 18A but cooler than the ambient temperature of a classical computer 100. It should be appreciated that embodiments are not limited to the example scenario illustrated with two controllers. Rather, one or more embodiments using the proposed instruction hierarchy can be implemented using one, two, or multiple controllers that implement different parts/levels of the instruction hierarchy, at different temperature zones.

The controller 18B of the quantum computer 10 is configured to receive a plurality of inputs 28 and to provide a plurality of outputs 30 to classical computer 100. The inputs and outputs can each include digital and/or analog lines in a network 50. At least some of the inputs and outputs can be data lines through which data is provided to and/or extracted from the quantum computer 10. Other inputs can include control lines through which the operation of the quantum computer can be adjusted or otherwise controlled. In one or more embodiments, the quantum computer 10 can be coupled to a classical computer 100. Further, details of the example computer 100 are discussed in FIG. 11.

The controller 18A is operatively coupled to the quantum circuit 12 via quantum interface 32. The quantum circuit 12 can be implemented as one or more physical devices, chips, qubit registers, etc. The quantum interface 32 is configured to exchange data bidirectionally with the controller 18A. The quantum interface 32 is further configured to exchange signals corresponding to the data bidirectionally with the qubit register. Depending on the architecture of quantum computer 10, such signal may include electrical, magnetic, and/or optical signal. By the signal conveyed through the quantum interface 32, the controller 18A can interrogate and otherwise influence the quantum state held in various qubits 14. For example, the controller 18A can interrogate and otherwise influence the quantum state held a qubit register, as defined by a collective quantum state of a group of qubits 14. The quantum interface 32 includes at least one modulator 34 and at least one demodulator 36, each coupled operatively to one or more qubits 14 of the quantum circuit 12. In one or more embodiments, a modulator 34 and a demodulator 36 can each be coupled to qubits in a qubit register. Each modulator 34 is configured to output a signal to one or more qubits 14 in the quantum circuit 12 based on modulation data received from the controller 18A. In one or more embodiments, at least one modulator 34 can output a signal to qubits in a qubit register based on modulation data received from the controller 18A. Each demodulator 36 is configured to sense a signal from the one or more qubits 14 of the quantum circuit 12 and to output data to the controller 18A based on the signal. In one or more embodiments, each demodulator 36 is configured to sense a signal from the qubit register and to output data to the controller 18A based on the signal. The data received from the demodulator 36 can, in some examples, be an estimate of an observable to the measurement of the quantum state held in one or more qubits 14 in the quantum circuit 12. In one or more embodiments, the data received from the demodulator 36 can be an estimate of an observable to the measurement of the quantum state held in the qubit register.

In some examples, the modulator 34 can transmit a suitably configured signal to interact physically with one or more qubits 14 of the quantum circuit 12 in order to trigger measurement of the quantum state held in one or more qubits 14. The demodulator 36 can then sense a resulting signal released by the one or more qubits 14 pursuant to the measurement and can provide the data corresponding to the resulting signal to the controller 18A. Stated another way, the demodulator 26 is configured to output, based on the signal received, an estimate of one or more observables reflecting the quantum state of one or more qubits of the qubit register, and to furnish the estimate to the controller 18A. In one non-limiting example, the modulator 34 can provide, based on data from the controller 18A, an appropriate voltage pulse or pulse train to an electrode of one or more qubits 14, to initiate a measurement. In short order, the demodulator 36 can sense photon emission from the one or more qubits 14 and can assert a corresponding digital voltage level on a quantum-interface line into the controller 18A. Generally speaking, any measurement of a quantum-mechanical state is defined by the operator "O" corresponding to the observable to be measured; the result "R" of the measurement is guaranteed to be one of the allowed eigenvalues of "O". In the quantum computer 10, "R" is statistically related to the qubit-register state prior to the measurement but is not uniquely determined by the qubit-register state.

Pursuant to appropriate input from the controller 18A, the quantum interface 32 may be configured to implement one or more quantum-logic gates to operate on the quantum state held in the quantum circuit 12, for example, in a qubit register in the quantum circuit 12. While the function of each type of logic gate of a classical computer system is described according to a corresponding truth table, the function of each type of quantum gate is described by a corresponding operator matrix. The operator matrix operates on (i.e., multiplies) the complex vector representing the qubit register state and effects a specified rotation of that vector in Hilbert space.

For example, the Hadamard gate HAD is defined by $$HAD = \frac{1}{\sqrt{2}}\begin{bmatrix} 1 & 1 \\ 1 & -1 \end{bmatrix}. \qquad (A)$$

The HAD gate acts on a single qubit; it maps the basis state |0> to (|0>)/√2, and maps to |1> to (|0>−|1>)/√2. Accordingly, the HAD gate creates a superposition of states that, when measured, have equal probability of revealing |0> or |1>.

The phase gate S is defined by $$S = \begin{bmatrix} 1 & 0 \\ 0 & e^{i\pi/2} \end{bmatrix}. \qquad (B)$$

The S gate leaves the basis state |0> unchanged but maps |1> to $e^{i\pi/2}$|1>. Accordingly, the probability of measuring either |0> or |1> is unchanged by this gate, but the phase of the quantum state of the qubit is shifted. This is equivalent to rotating ψ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1000 \\ 0010 \\ 0100 \\ 0001 \end{bmatrix}. \qquad (C)$$

The foregoing list of quantum gates and associated operator matrices is non-exhaustive, but is provided for ease of illustration. Other quantum gates include Pauli-X, -Y, and -Z gates, the √NOT gate, additional phase-shift gates, the √SWAP gate, controlled cX, cY, and cZ gates, and the Toffoli, Fredkin, Ising, and Deutsch gates, as non-limiting examples.

Figure 3:
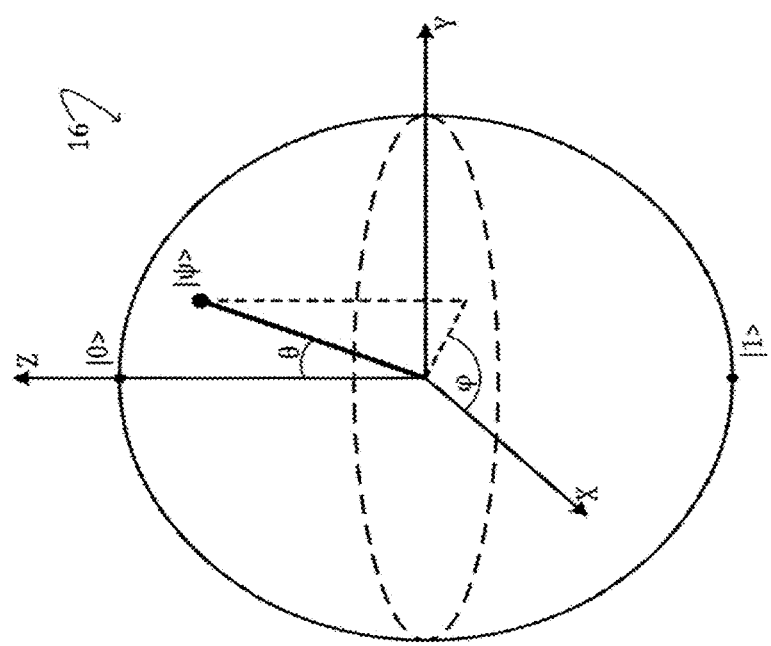
FIG. 3 is a graph of example signal levels and associated durations to assert a quantum-gate operation on one or more qubits of a quantum circuit in accordance with one or more embodiments.

Continuing in FIG. 1, suitably configured signals from modulators 34 of the quantum interface 32 can interact physically with one or more qubits 14 of the quantum circuit 12, for example, a qubit register in the quantum circuit 12, so as to assert any desired quantum-gate operation. As noted above, the desired quantum-gate operations are specifically defined rotations of a complex vector representing the qubit register state. In order to effect a desired rotation "O", one or more modulators of quantum interface 32 can apply a predetermined signal level $S_i$ for a predetermined duration $T_i$. In some examples, plural signal levels can be applied for plural sequenced or otherwise associated durations, as depicted in FIG. 3, to assert a quantum-gate operation on one or more qubits of the quantum circuit 12, for example, in a qubit register of the quantum circuit 12. In general, each signal level $S_i$ and each duration $T_i$ is a control parameter adjustable by appropriate programming of controller 18A.

The term 'oracle' is used herein to describe a predetermined sequence of elementary quantum-gate and/or measurement operations executable by quantum computer 10. An oracle can be used to transform the quantum state of qubits 14 in the quantum circuit 12, for example, qubits in a qubit register, to effect a classical or non-elementary quantum-gate operation or to apply a density operator, for example. In some examples, an oracle may be used to enact a predefined 'black-box' operation f(x), which may be incorporated in a complex sequence of operations. To ensure adjoint operation, an oracle mapping n input qubits |x> to m output or ancilla qubits |y>f(x) may be defined as a quantum gate O(|x>⊗|y>) operating on the n+m qubits. In this case, O can be configured to pass the n input qubits unchanged but combine the result of the operation f(x) with the ancillary qubits via an XOR operation, such that O(|x>⊗t>)=x>⊗|y+f(x)>. As described further below, a state-preparation oracle is an oracle configured to generate a quantum state of specified qubit length.

Implicit in the description herein is that each qubit 14 of qubit registers can be interrogated via quantum interface 32 so as to reveal with confidence the standard basis vector |0> or |1> that characterizes the quantum state of that qubit. In some implementations, however, measurement of the quantum state of a physical qubit could be subject to error. Accordingly, any physical qubit 14 can be implemented as a logical qubit, which includes a grouping of physical qubits measured according to an error-correcting oracle that reveals the quantum state of the logical qubit with confidence.

Topological Quantum Computer: In a topological quantum computer, the quantum state held in each qubit is a state of two or more braidable quasiparticles, or "anyons", observed within a non-Abelian topological phase of matter. The world lines of different anyons are quantum mechanically forbidden from intersecting or merging. This feature forces their paths to form stable braids that pass around each other in space-time. Relative to trapped particles used in other types of quantum computers, anyon braids are more resistant to quantum decoherence, which is a source of error in quantum computation. However, the realization of a topological quantum computer has the ability to engineer a suitable topological phase and to manipulate the anyons therein.

Early experiments in topological quantum computing focused on the two-dimensional 'electron gas' of a supercooled, thin layer of gallium arsenide (GaAs) sandwiched between layers of aluminum gallium arsenide (AlGaAs) and manipulated in a strong magnetic field. Implementation of a quantum computer using that architecture includes the braiding of individual quasiparticle excitations combined with anyonic interferometry-based measurement, involving coherent quasiparticle transport over significant distances.

Proposed more recently is a one-dimensional topological qubit architecture that is more amenable to practical implementation. The proposed system uses a semiconductor-superconductor heterostructure wherein superconductivity, strong spin-orbit coupling, and magnetic fields cooperate to form a topological, superconducting state that supports *Majorana* zero modes (MZMs). This architecture obviates the need to move quasiparticles by employing a "measurement-only" method wherein a sequence of measurements has the same effect as a braiding operation. This architecture does not require quasiparticles to be moved through an interferometry loop, but rather exploits a distinction between a "fermion parity-protected topological phase" (the actual genus of the proposed heterostructure) and a true topological phase. Advantageously, topological charge in a fermion parity-protected topological phase can be manipulated by the process of electron tunneling into an MZM. Transport through a pair of MZMs can provide a measurement of their combined topological charge in the presence of a large charging energy.

In view of these and other useful properties, MZMs can be used as a basis for the qubits of a topological quantum computer. The MZMs are created at the ends of semiconductor-superconductor heterostructures tuned into a topological regime by the appropriate magnetic field and gate voltages. A series of practical implementations are described in Karzig et al., *Scalable Designs for Quasiparticle-Poisoning-Protected Topological Quantum Computation with Majorana Zero Modes*, arXiv:1610.05289v4 [cond-mat.mes-hall]21 Jun. 2017. Suitable heterostructure materials and material properties are described in Lutchyn et al., *Majorana Fermions and a Topological Phase Transition in Semiconductor-Superconductor Heterostructures*, arXiv: 1002.4033v2 [cond-mat.supr-con] 13 Aug. 2010. The entirety of both of the above references is hereby incorporated by reference herein, for all purposes.

Example implementations include at least two topological superconducting segments in a qubit, totaling at least four *Majorana* zero modes per qubit. The states used for quantum computation is the degenerate ground states of the qubit, in contrast to non-degenerate quantum-computing architectures where the two states of the qubit have different energies. The degeneracy of the qubit states and the spatial separation of the *Majorana* zero modes ensure long coherence times and feasibility of precise application of a set of Clifford gates.

FIG. 4 illustrates an example layout of a square lattice of tetrons used to implement a honeycomb and 4.8.8 Floquet codes. In FIG. 4, topological superconducting wires 402 have a MZM at both ends. Qubit islands 404 correspond to two parallel topological superconducting wires 402 joined by a trivial superconducting backbone, with MZMs 430 labeled according to the box in the upper left. MZMs 430 are illustrated for a single tetron 410 but applies to all of the tetrons 410. Rows of tetrons 410 are separated by coherent links 412, which are floating topological wires. Neighboring qubit islands 404 are connected by semiconducting segments 420, with two semiconducting columns of semiconducting segments 420 separating each column of qubit islands 404. There are also rows of semiconductor regions connected the semiconductor segments 420 to coherent links 412 and superconducting wire 402. The coherent links 412 do not have the qubit islands 404. The superconducting wires 402 connect to qubit islands 404, which are the physical qubits 14 in the quantum circuit 12. Since the physical qubits 14 are arranged in an array, the qubit islands 404 are in columns. A semiconductor segment 406 can be referred to as length-1 semiconductor quantum dot with gate defined. A semiconductor segment 408 can be referred to as length-2 semiconductor quantum dot with gate defined.

Each tetron 410 in FIG. 4 includes a physical qubit, where the qubit islands 404 are the physical qubits 14. The tetron 410, which encompasses a qubit island 404, can be referred to as a physical qubit. In the example square lattice as at least a portion of the quantum circuit 12, there is an array of 6*4=24 tetrons displayed, each representing a physical qubit. As seen in FIG. 4, the MZM 430 appears at the end of each topological superconducting wire 402. A quartet of MZMs 430 forms a logical qubit, where each tetron 410 has two topological superconducting wires 402, and each wire has two MZMs 430. Altogether each tetron 410 has 4 MZMs which includes one physical qubit, for example, physical quit 14.

The Hastings-Haah code is an example measurement code for logical qubits, and the measurements are performed using plaquettes. The Hastings-Haah code is based on a honeycomb lattice. As noted herein, the instructions 24A cause measurements on the quantum circuit 12 using the modulators 34 and demodulators 36. A measurement of one or more physical qubits 14 is the result of sending a signal via the modulator 34 and receiving a signal back via the demodulator 36. The received signal, also referred to as the measurements, has the quantum information about the logical qubit that is formed of two or more physical qubits 14. Based on a signal sent and the received signal from the quantum circuit 12, a logical qubit is formed of two or more physical qubits 14 as understood by one of ordinary skill in the art. The various signals sent and corresponding signals received back can be performed using the scheme or code that follows/adheres to plaquettes, as understood by one of ordinary skill in the art.

Figure 5:
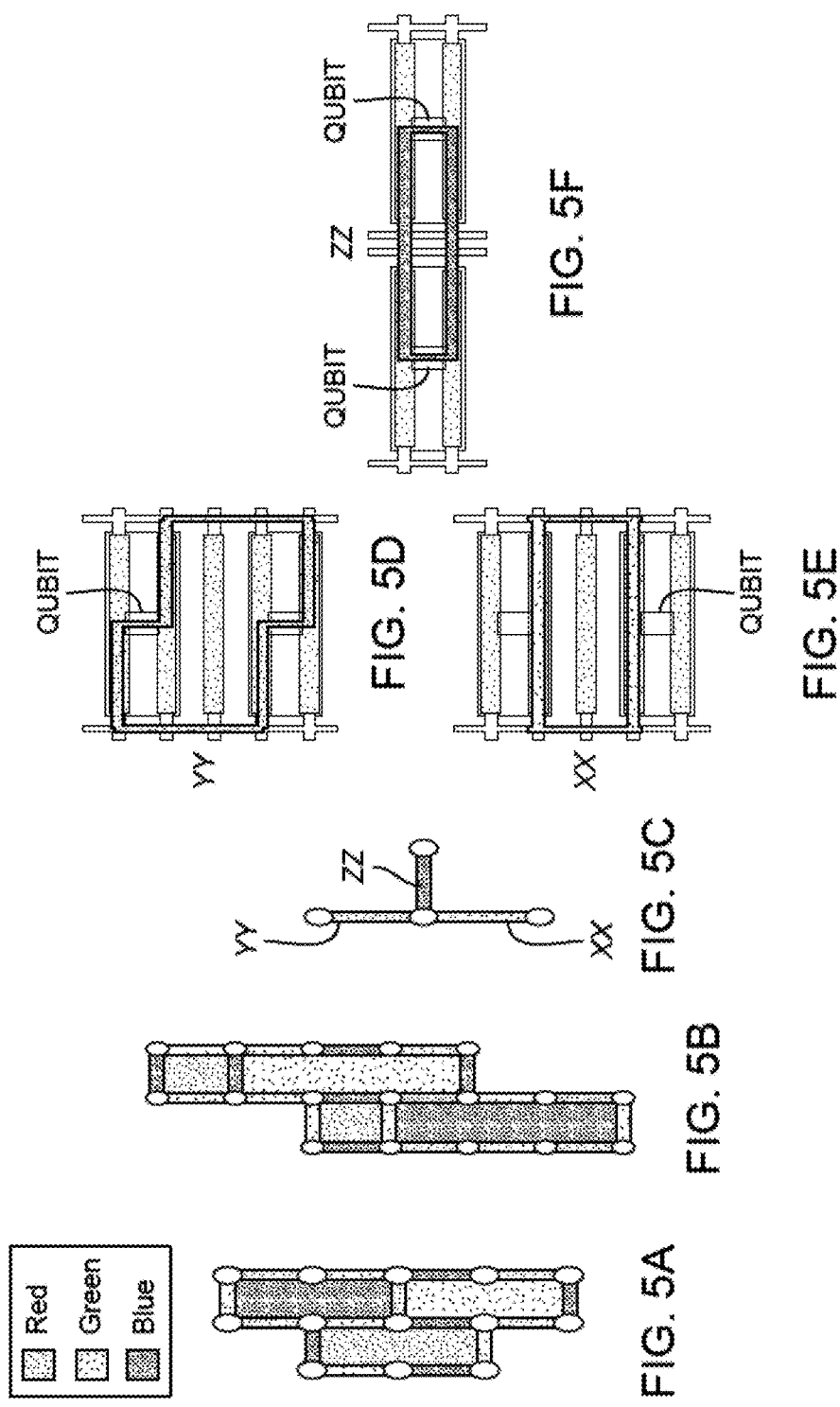
FIG. 5A depicts a vertical brick wall unit of a honeycomb lattice in accordance with one or more embodiments.
FIG. 5B depicts a vertical brick wall unit of the 4.8.8 lattice in accordance with one or more embodiments.
FIG. 5C depicts the directions for XX, YY, and ZZ measurements in accordance with one or more embodiments.
FIG. 5D depicts example bulk YY measurements in accordance with one or more embodiments.
FIG. 5E depicts example bulk XX measurements in accordance with one or more embodiments.
FIG. 5F depicts example bulk ZZ measurements in accordance with one or more embodiments.

Some examples of measurements are illustrated in FIGS. 5A, 5B, 5C, 5E, and 5F. FIG. 5A illustrates a vertical brick wall unit of a honeycomb lattice. FIG. 5B illustrates a vertical brick wall unit of the 4.8.8 lattice. FIG. 5C illustrates the directions for XX, YY, and ZZ measurements. FIG. 5D illustrates example bulk YY measurements. FIG. 5E illustrates example bulk XX measurements. FIG. 5F illustrates example bulk ZZ measurements. Colors are represented in FIGS. 5A, 5B, 5C, 5D, 5E, and 5F. The colors refer to the measurement time steps, rather than the Pauli operators. It is noted that the different colors describe the 3-coloring of the plaquettes and corresponding checks. The honeycomb and 4.8.8 lattices map to the tetron array of tetrons 410 of the quantum circuit 12 in FIG. 4 using vertical bricks such that each 2n-gon corresponds to a rectangle of height n. With this mapping, the honeycomb and 4.8.8 Floquet codes in the bulk use a subset of the highest fidelity two-qubit measurements: XX and YY measurements between vertically adjacent qubit islands in FIGS. 5E and 5D respectively, and ZZ between horizontally adjacent qubit islands in FIG. 5F. To implement measurements on neighboring pairs of vertically adjacent qubits without their corresponding loops intersecting, the two columns of semiconductor segments 420 separating each column of qubit islands 404, which are the qubits 14, can be utilized.

A published paper of a layout of the 4.8.8 Hastings-Haah code using *Majorana* based architectures has been presented in by Adam Paetznick, Christina Knapp, Nicolas Delfosse, Bela Bauer, Jeongwan Haah, Matthew B. Hastings, and Marcus P. da Silva, in *Performance of planar floquet codes with majorana-based qubits*, PRX Quantum, 4:010310, Jan. 25, 2023, which is herein incorporated by reference.

The Hastings-Haah code can be implemented in the instructions 24A in the quantum computer 10. In one or more embodiments, the Hastings-Haah code can be implemented as computer-executable instructions in the classical computer 100 and sent to the quantum computer 10 for execution. As understood by one of ordinary skill in the art, Hastings-Haah code denotes a technique of operating the 2D array of qubits 14 in the quantum circuit 12. Moreover, the Hastings-Haah code is a sequence of two qubit measurements on the quantum circuit 12 of the quantum computer 10, and the classical computer 100 eventually stores those measurement outcomes. That sequence of two qubit measurements is programmed into the classical computer 100, which then sends signals to the quantum computer 10, indicating which operations to perform on the quantum circuit 12.

Figure 6:
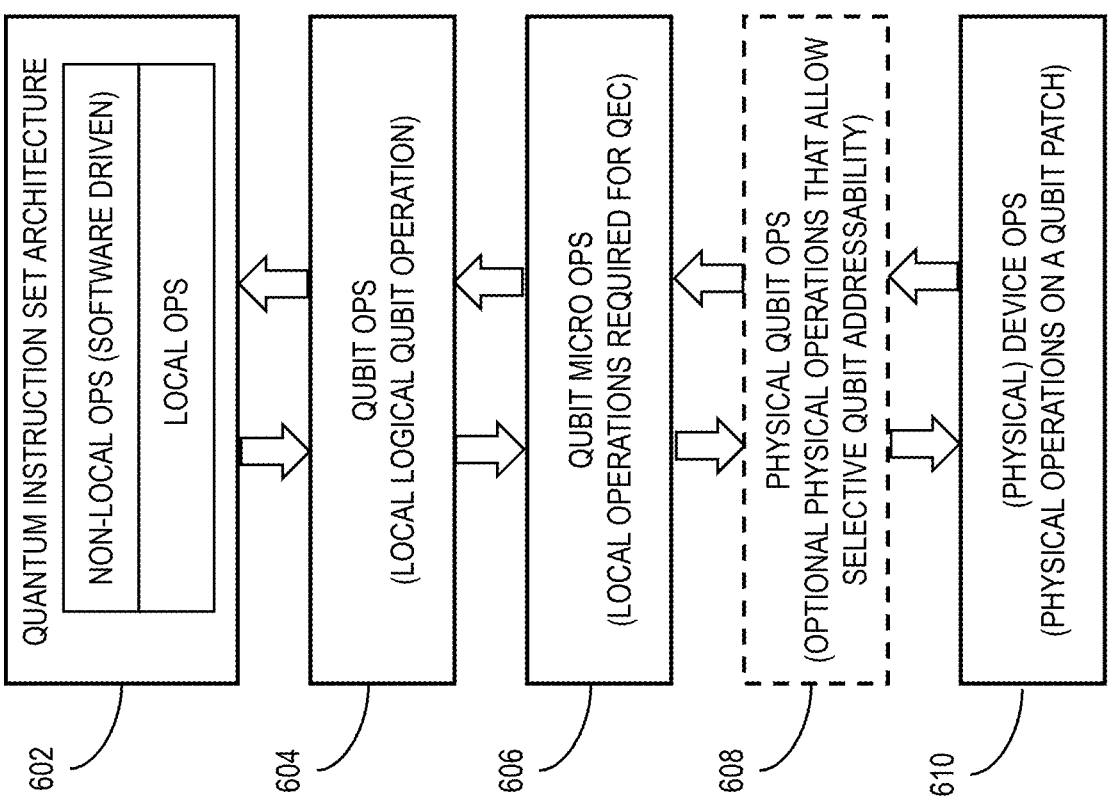
FIG. 6 depicts an example block diagram of a practical scale quantum instruction hierarchy in accordance with one or more embodiments.

FIG. 6 depicts a block diagram of a practical scale quantum instruction hierarchy 90 in accordance with one or more embodiments. Block 602 depicts quantum instruction set operations as the highest translation level in the quantum instruction hierarchy 90. The quantum instruction set operations include a set of operations that defines the interface between quantum software and hardware. The quantum instruction set operations are composed of logical operations and implemented in terms of the native qubit operations that are supported in the layer below (i.e., qubit operations in block 604). The quantum instruction set operations are divided into two categories: local and nonlocal. The local operations are logical operations with a fixed control overhead, typically consisting of nearest neighbour quantum operations such as joint measurements or multi-qubit gates. The local operations are processed by quantum hardware (engine). These local operations could include operations that are native to certain quantum error correction codes but could also include operations that are more broadly implementable across a family of error correction schemes, such as a CNOT gate. The non-local operations are composed using the local operations and are processed and issued through software.

Block 604 depicts the qubit operations that consist of natively available logical operations in the QEC scheme. Although it may be unlikely to design a set of qubit operations that work natively across every type of QEC scheme, one or more embodiments desire that the qubit operation be at least compatible with known code types such as the surface code and Hastings-Haah code, which are relevant for planar quantum devices. In one or more embodiments, for each operation or set of operations for the quantum instruction set operations of block 602, there is a translation to a corresponding fixed number (or fixed set) of operations of the qubit operations of block 604 (and vice versa).

Block 606 depicts qubit micro operations. This layer in the quantum instruction hierarchy 90 is defined to include operations that are required to implement one or more QEC schemes. One constituent of qubit micro operations at this layer is syndrome measurement operations such as a single round of stabilizer checks required in the surface code. The implementation of the qubit micro operations layer includes the details of the QEC scheme; however, attributes such as code distance, cycle time, and decoder information are microarchitectural details that can be abstracted away by this layer. In one or more embodiments, for each operation or set of operations for the qubit operations of block 604, there is a translation to a corresponding fixed number (or fixed set) of operations of the micro qubit operations of block 606 (and vice versa).

Optional block 608 depicts physical qubit operations illustrated with a dashed line. This is an optional level in the quantum instruction hierarchy 90. This layer is implemented using device operations, but it provides masking functionality to create operations that can address individual physical qubits 14. While this mode of individually addressing physical qubits 14 is not expected to be used in a practical application execution, it may be useful for testing and validation of QEC schemes or device bring up (e.g., start or initiation) and calibration experiments.

Block 610 depicts the physical device operations. This set of operations is the lowest translation level in the quantum instruction hierarchy 90. The physical device operations include operations that are directly executable on the physical qubits 14. For example, in the case of topological qubit systems, physical device operations are loop operations, while in the case of superconducting qubits physical device operations could be a physical rotation gate or a two-qubit gate such as a controlled Z (CZ) gate. Because practical implementations of QEC operations in the layers above use physical device operations on patches of qubits 14, one or more embodiments define that physical device operations operate on patches of qubits 14 in a parallel fashion. For example, a physical device operation could be executing a physical rotation qubit on a set of 16 physical qubits 14 in parallel. Defining device operations in terms of qubit patches rather than individual physical qubits 14 is useful to limit the programmability of the physical device and the control system to only the small subset of cases that are required for QEC implementation. In one or more embodiments, for each operation or set of operations for the qubit micro operations of block 606, there is a translation to a corresponding fixed number (or fixed set) of operations of the physical device operations of block 610 (and vice versa).

Further details and examples regarding the lowest level to the highest level in the quantum instruction hierarchy 90 are provided, which are from physical device operations of block 610, qubit micro operations of block 606, qubit operations of block 604, to quantum instruction set operations of block 602.

Physical Device Operations: With respect to further details regarding physical device operations (e.g., block 610) at the lowest level in the quantum instruction hierarchy 90, example physical device operations for *Majorana* qubits (or other types of qubits) could include the following instructions:

1. Measure XX and Measure ZZ, which are joint Pauli measurement operations on two qubits.
2. InitX, InitY, InitZ instructions for state preparation in each Pauli basis.
3. MeasX, MeasY, MeasZ instructions for measurement in each Pauli basis.
4. PrepareT state to prepare a noisy physical T state.

These physical device operations of block 610 run on a patch (collection) of physical qubits 14 in parallel. A patch of physical qubits 14 is encoded as a logical qubit.

For superconducting qubits, one can assume SIMD-like CNOTs, with initialize and measurement operations. For stabilizer operations, there can be a surface code stabilizer measurement circuit that uses physical operations. As an example, physical device operations of block 610 may be to, for example, stabilize for a d×d square patch surface code as provide below:

1. Initialize all X ancillas in a 0 state.
2. Initialize all Z ancillas in a + state
3. Each ancilla is surrounded by 4 data qubits (which may be called north, west, south, and east qubits).
4. Perform CNOTs from each north data qubit to ancilla (which are performed in parallel across many qubits).
5. Perform CNOTs from west data qubit to ancilla.
6. Perform CNOTs from south data qubit to ancilla.
7. Perform CNOTs from east data qubit to ancilla.
8. Measure all ancillas.

Figure 7:
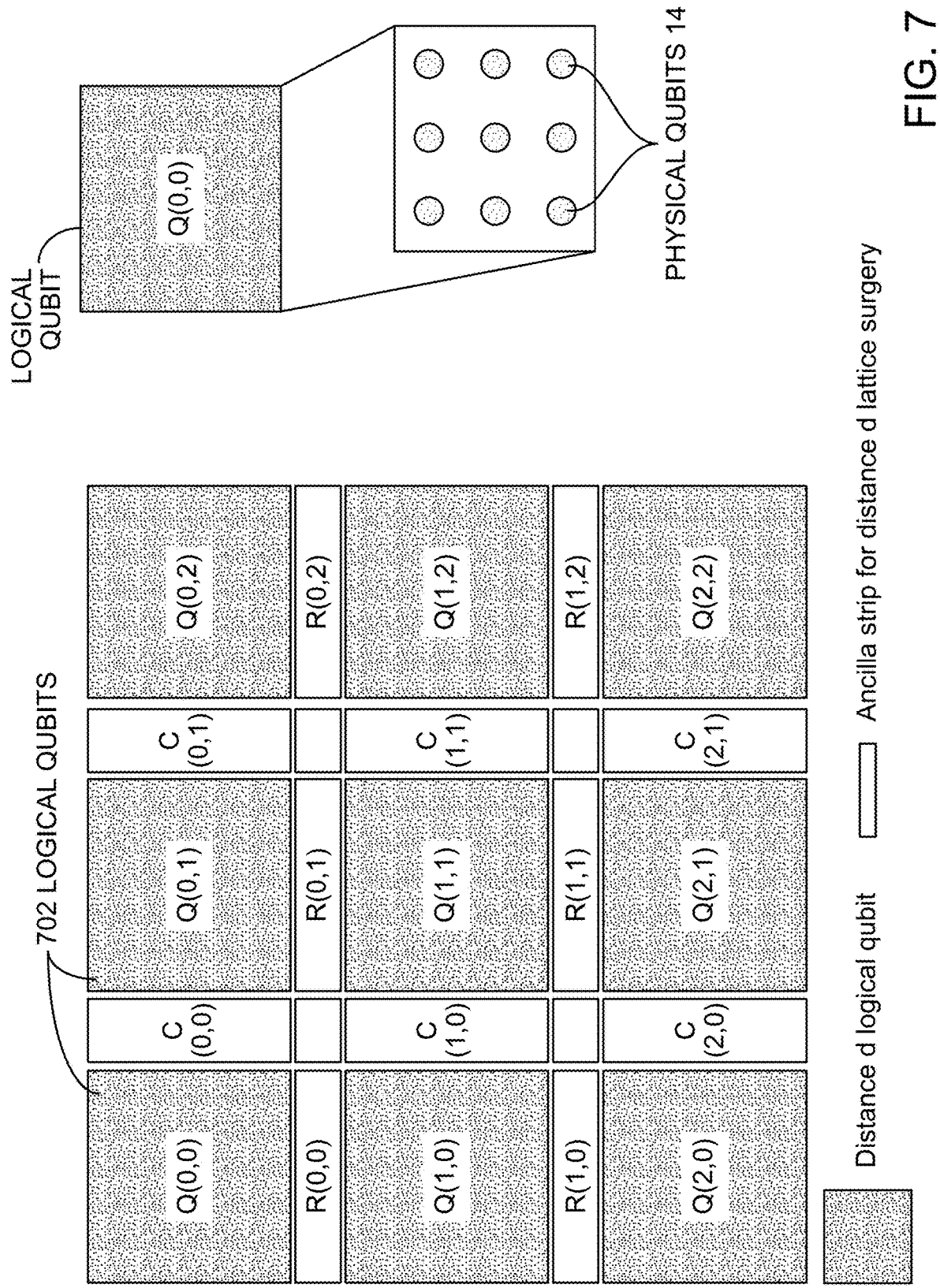
FIG. 7 depicts an example system with logical qubits having intermediate row and column ancilla patches for lattice surgery in accordance with one or more embodiments.

Qubit Micro Operations: With respect to further details regarding qubit micro operations of block 606 at the next level in the quantum instruction hierarchy 90, FIG. 7 depicts an example system with 9 logical qubits 702 having intermediate row (R) and column (C) ancilla patches for lattice surgery according to one or more embodiments. Each logical qubit is composed of several physical qubits 14, but micro operations abstract away this information. Instructions in the qubit micro operations layer of block 606 allow addressability of qubit patches and ancillary patches (both of which are logical qubits) to implement operations such as lattice surgery. Qubit micro operations of block 606 are designed to be broadly useful across different QEC schemes; however, the implementation of these qubit micro operations are to be specific to each scheme and code parameters.

MeasureXX and measureZZ qubit operations of block 604 can be implemented in terms of micro qubit operations of block 600 by using split, merge, stabilize, set, and read operations. An example set of qubit micro operations of block 606 may include the following:

1. Set/Read operations:
   a. These operations are preparatory operations that are not corrected with multiple rounds of stabilizer checks.
   b. Set0 Q(i,j) Set+ Q(i,j), Set0 R(i,j), Set+ R(i,j), Set0 C(i,j), Set+ R(i,j): Set physical data qubits of Q(i,j), R(i,j) or C(i,j) to|0> or |+>.
   c. ReadX Q(i,j), ReadZ Q(i,j): Measure data qubits of Q(i,j) in X or Z basis.
2. Stabilizer measurements:
   a. Stabilize Q(i,j): Measure one round of stabilizers for Q(i,j)
   b. Stabilize C(i,j), Stabilize R(i,j): Measure one round of column or row stabilizers at C(i,j) or R(i,j).
   c. MaskedStabilize Q(i,j), mask, stabilizer_types.
   d. MaskedStabilize C(i,j)/R(i,j), mask, stabilizer_types.
3. Operations on a collection of physical T factories:
   a. DistilT: distils a set of noisy T states using physical distillation.
   b. Encode: converts physical Ts into logical Ts of a fixed distance.

Figure 8:
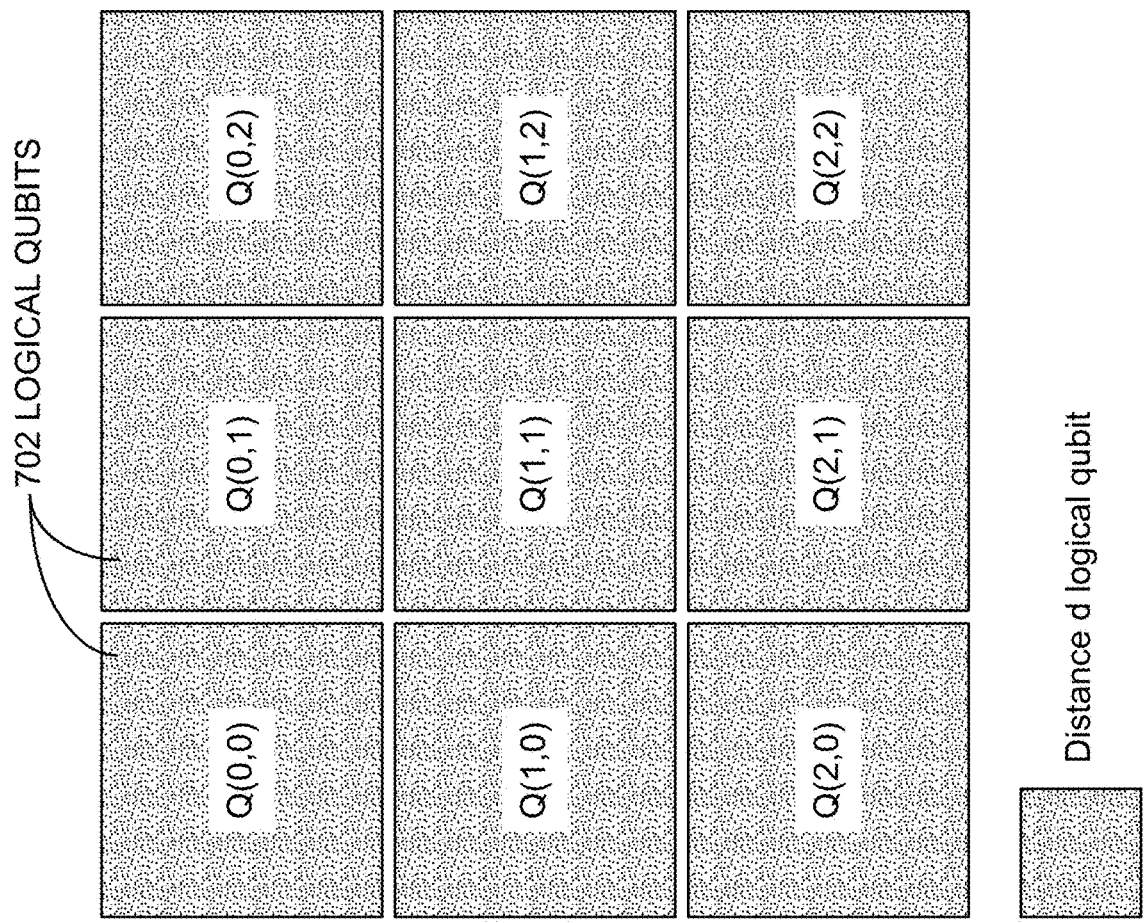
FIG. 8 depicts an example system with logical qubits analogous to FIG. 7 in accordance with one or more embodiments.

Qubit Operations: Now turning to further details regarding qubit operations of block 604 of the quantum instruction hierarchy 90, FIG. 8 depicts an example system with 9 logical qubits 702 analogous to FIG. 7. As seen in FIG. 8, row and column ancillas are no longer addressable at the qubit operation level of block 604. Each logical qubit 702 is shown as a square patch for illustration but may also include other patch shapes such as a honeycomb lattice. For the qubit operations of block 604, examples of (1) single qubit operations, (2) single qubit operations that require logical ancillas, (3) two-qubit operations, (4) qubit movement, (5) logical T factory operations, and (6) qubit operations for constructing larger instructions are presented below. The example qubit operations of block 604 will start with example operations (1) and proceed through example operations (5) for illustration purposes.

(1). Single qubit operations:
  a. Init0, Init+: Initialize logical qubit using Set and Stabilize.
  b. IdleOp: Stabilize active qubits when no program operations act on it.
  c. MeasX, MeasZ: Logical qubit measurement using ReadX, ReadZ.
(2). Single qubit operations that require logical ancillas:
  a. S: uses Merge, Stabilize, MeasZZ
  b. H: uses MaskedStabilize
(3). Two-qubit operations:
  a. Merge: Initiate a merge between two logical qubits. This operation does not issue micro operations but serves as a bookkeeping operation for the decoder.
  b. Split: Initiate a split between two logical qubits.
  c. MeasXX: between horizontal neighbours using Merge, Split.
  d. MeasZZ: between vertically neighbours using Merge, Split.
  e. PrepareBell: between vertical or horizontal neighbours using MeasZZ/XX.
  f. MeasBell: between vertical or horizontal neighbours using MeasZZ/XX.
  g. MeasXZ: between diagonal neighbours using MaskedStabilize and Move.
  h. CNOT: Using MeasXX/ZZ.
(4). Qubit movement:
  a. MoveK Q(i,j), Q(p,q): source, destination pair separated by K hops. Fixed K, chosen for an architecture using Init, MeasXX/ZZ, MeasX/Z.
(5). Logical T factory operations:
A. Logical T Factory interface:
  a. ConsumeT Q(i,j), Q(p,q)—Q(p,q) is in the T state, nearest neighbor with Q(i,j) with the same encoding as the data qubit.
  b. DistilT Q(i,j)—distils a logical T state and places it in Q(i,j), a special qubit location that the factory is assigned.
B. Logical operations needed for T factory operations:
  a. Fixed size Measure ZZZ . . . Z based on common case factory choices, e.g., MeasZZZ, MeasZZZZ for MeasZZZZZ for supporting 15:1 distillation.
  b. MoveK, PrepareBell, CNOT, SWAP.
  c. Encode Q(i,j), d: Change the distance of a logical qubit to d.
(6). Qubit operations for constructing larger instructions:
  a. InitTree qubit_array, ancilla_array.
  b. MergeTree qubit_array, ancilla_array.
  c. StabilizeTree qubit_array, ancilla_array.
  d. SplitTree qubit_array, ancilla_array.
  e. Fixed tree size based on the architecture:
    i. ConnectTree ancilla1, ancilla2.
    ii. DisconnectTree ancilla1, ancilla2.

Figure 9A:
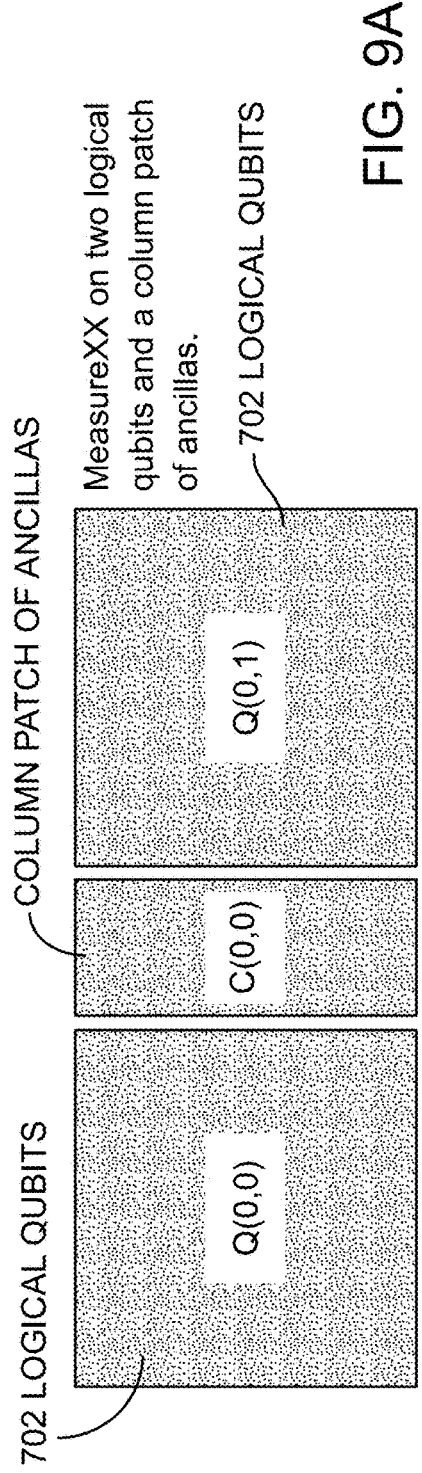
FIG. 9A depicts a portion of a qubit layout in accordance with one or more embodiments.

There can be various types of qubit operations including measureXX, measureZZ, prepareX, etc. For example, FIG. 9A depicts a portion of a qubit layout that illustrates measureXX on two logical qubits and a column patch of ancillas. FIGS. 9B, 9C, 9D, and 9E depict further details of the qubit operations for measureXX.

Figure 9B:
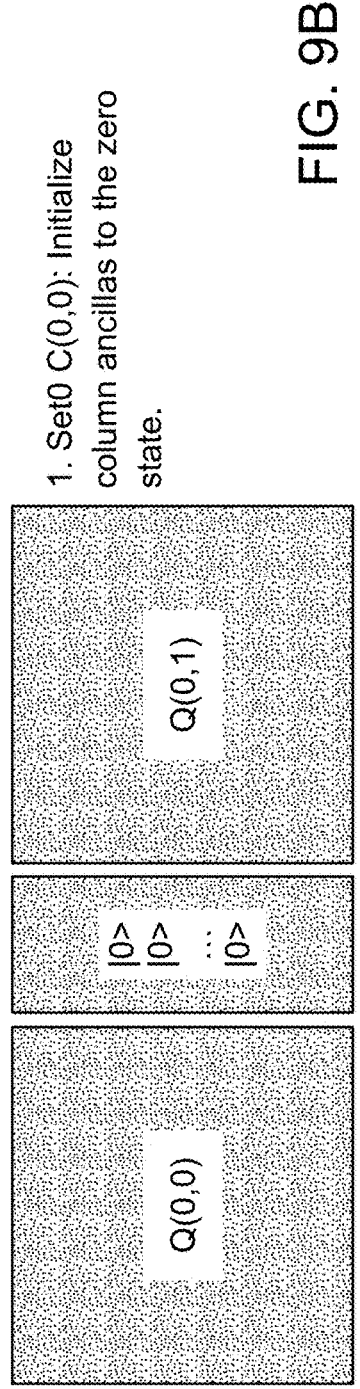
FIGS. 9B, 9C, 9D, and 9E depict further details of the qubit operations for measureXX in accordance with one or more embodiments.
Figure 9C:
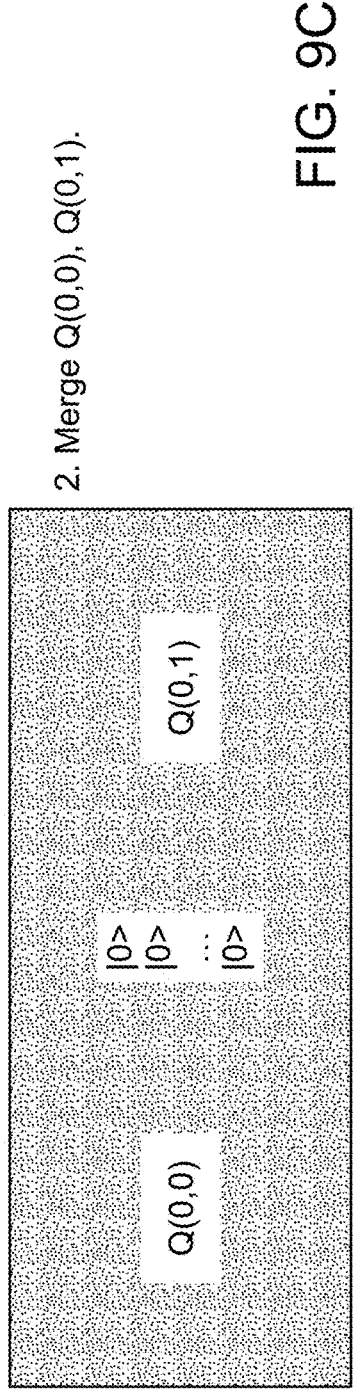
Figure 9D:
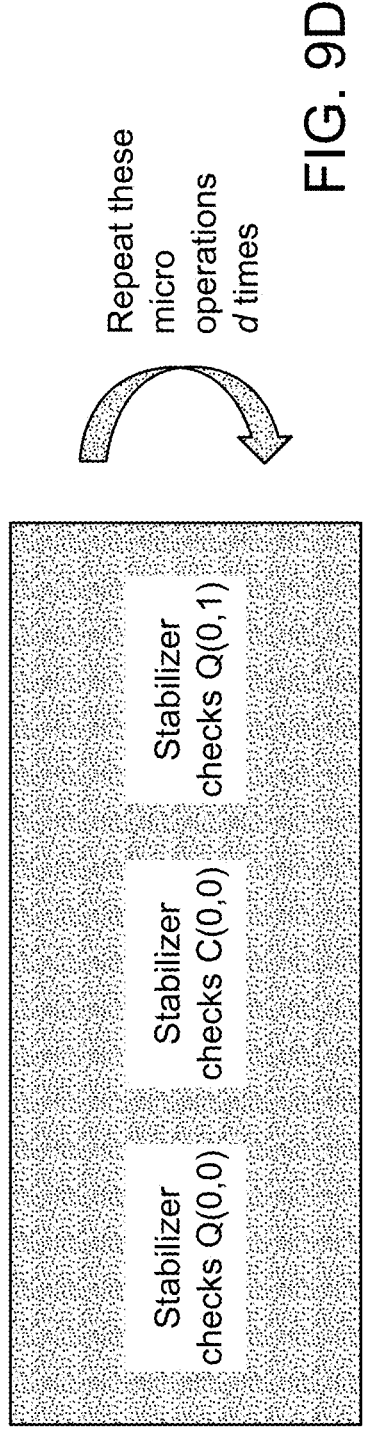
Figure 9E:
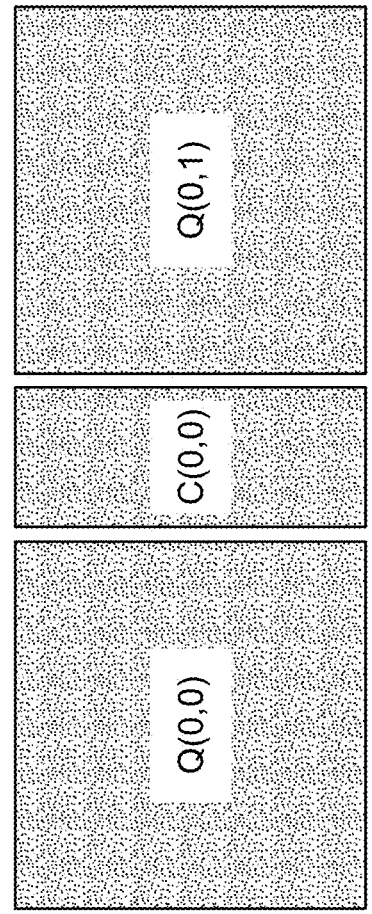

Qubit operations for MeasXX Q(0,0), Q(0,1):
1. Set0 C(0,0) (e.g., initialize column ancillas to the zero state as depicted in FIG. 9B).
2. Merge Q(0,0), Q(0,1)/instruct the decoder and control system (e.g., as depicted in FIG. 9C).
3. Repeat d times (e.g., as depicted in FIG. 9D):
   i. Stabilize C(0,0)
   ii. Stabilize Q(0,0)
   ii. Stabilize Q(0,1)
4. Split Q(0,0), Q(0,1) (as depicted in FIG. 9E).
Then, classical processing is performed to find a 1-bit output.

Figure 10:
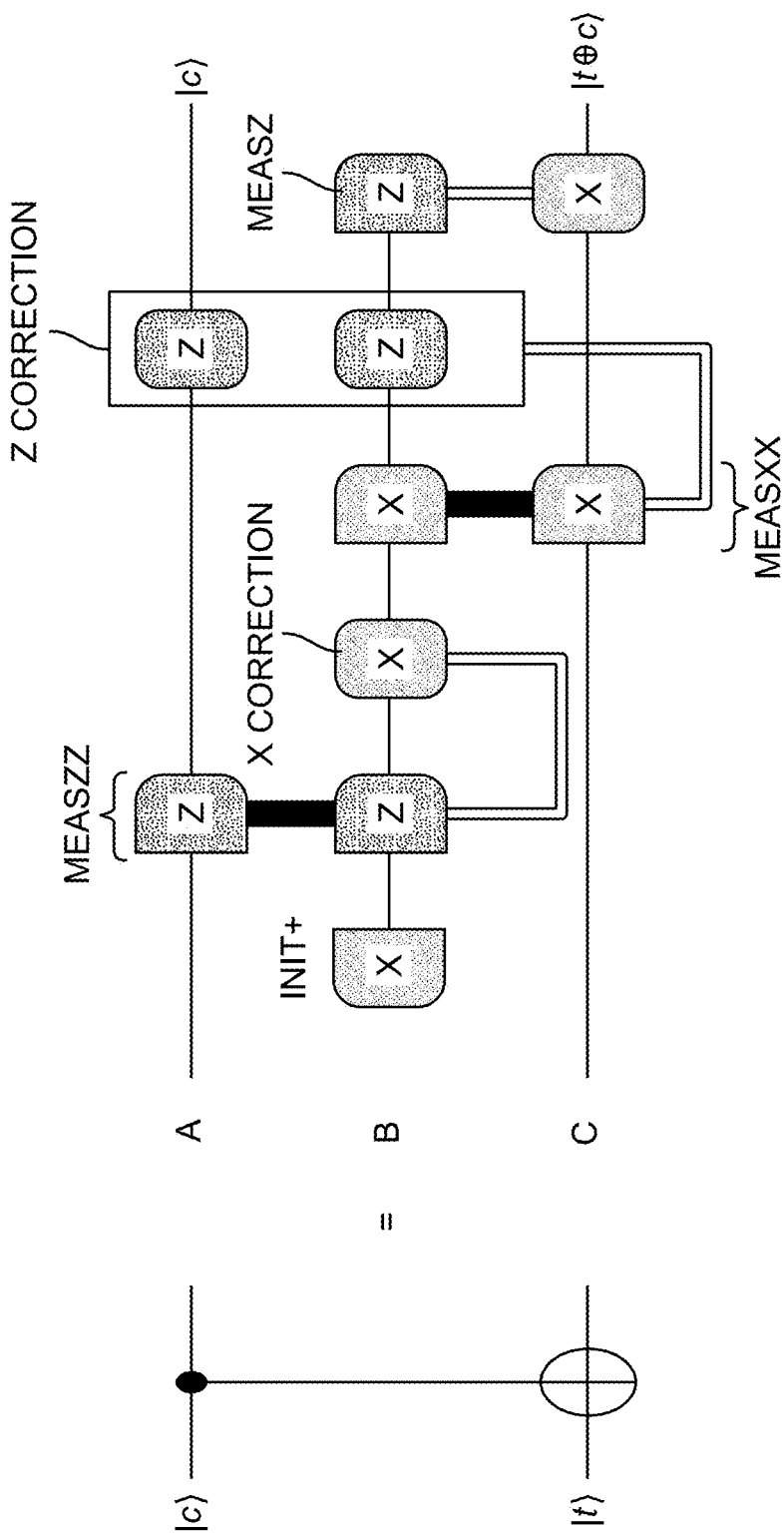
FIG. 10 depicts a 3 qubit controlled NOT (CNOT) as an example of an instruction set operation in accordance with one or more embodiments.

Instruction Set Architecture: With respect to further details regarding instruction set architecture (ISA) operations of block 602, the following example operations for local operations and non-local operation are illustrated below.
1. Local operations:
   a. All native logical qubit operations from the layer below are exposed through the ISA (Init, MeasureXX/ZZ etc.).
   b. The ISA may include a richer set of local operations such as CNOT, CZ, and SWAP gates.
2. Non-local operations:
   a. Arbitrary multi-qubit Pauli measurements.
   b. Operations required to build cat states over an arbitrary patch of qubits: PrepareCatState.
   c. CreateRemoteBellPair
   d. Remote CNOT
   e. Remote Move Another example ISA-level operation of block 602 is depicted in FIG. 10. FIG. 10 depicts an example of a 3 qubit CNOT to illustrate another ISA operation. FIG. 10 provides an example of an ISA-level operation that can be performed according to one or more embodiments and is an adaptation of a reference by Thomas Haner, Vadym Kliuchnikov, Martin Roetteler, and Mathias Soeken, in *Space-time optimized table lookup*, of arXiv:2211.01133v1 [quant-ph] 2 Nov. 2022, which is herein incorporated by reference.

The ISA level operations of block 602 are not simply a software programmable interface to the qubit operations of block 604. Most quantum computing system implementations in the field envision that the ISA level simply exposes the underlying qubit operations implemented with a quantum error correction microarchitecture. However, one or more embodiments form the ISA-level operations to include higher level macro operations that make use of sequences of multiple qubit operations to implement a certain piece of quantum information processing such as: quantum teleport, swap, multi-qubit parity detect, remote Bell pair creation, quantum phase estimation, amplitude amplification, etc. Accordingly, it should be understood that the instruction set architecture operations of block 602 are not simply a way of exposing qubit operations to the programmer through an interface but are a macro-level set of instructions as described herein.

Figure 12A:
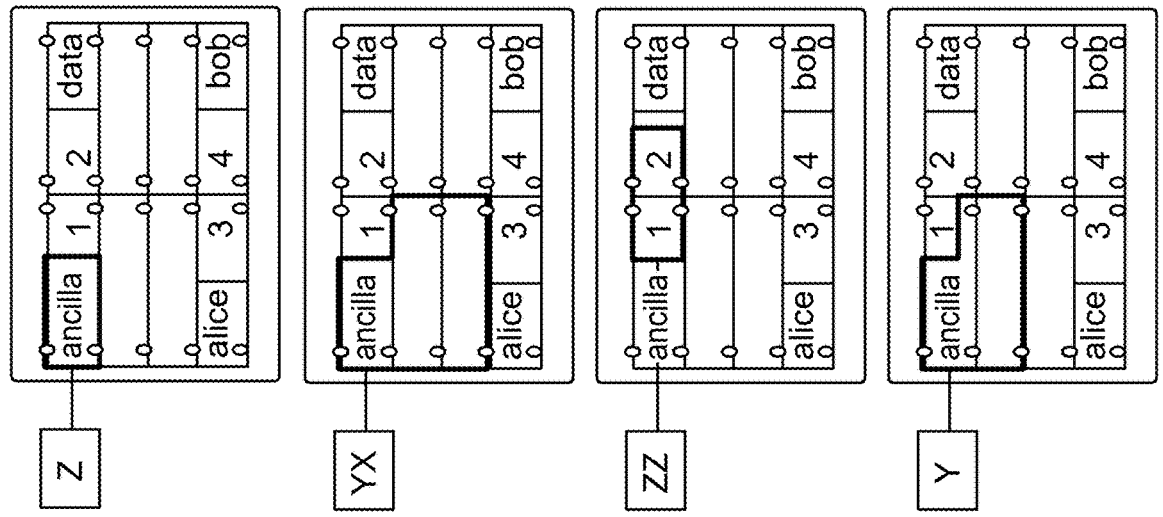
FIG. 12A depicts translating qubit micro operations to physical device operations from a physical qubit aspect in accordance with one or more embodiments.

For illustration purposes, FIGS. 12A and 12B depict the mapping of qubit micro operations to device operations. Although the examples in FIGS. 12A and 12B are specific to the topological qubit approach, it should be appreciated that the instruction hierarchy 90 covers any micro operation to physical operation mapping on a quantum computing system even if the physical qubits are exchanged.

FIG. 12A depicts qubit micro operations to physical device operations from a physical qubit aspect. In FIG. 12A, this example illustrates a translation of qubit measurements to a loop sequence. FIG. 12B depicts qubit micro operations to physical device operations from a logical qubit aspect. In FIG. 12B, this example illustrates a translation of logical qubit measurements to physical loop sequences.

Figure 13:
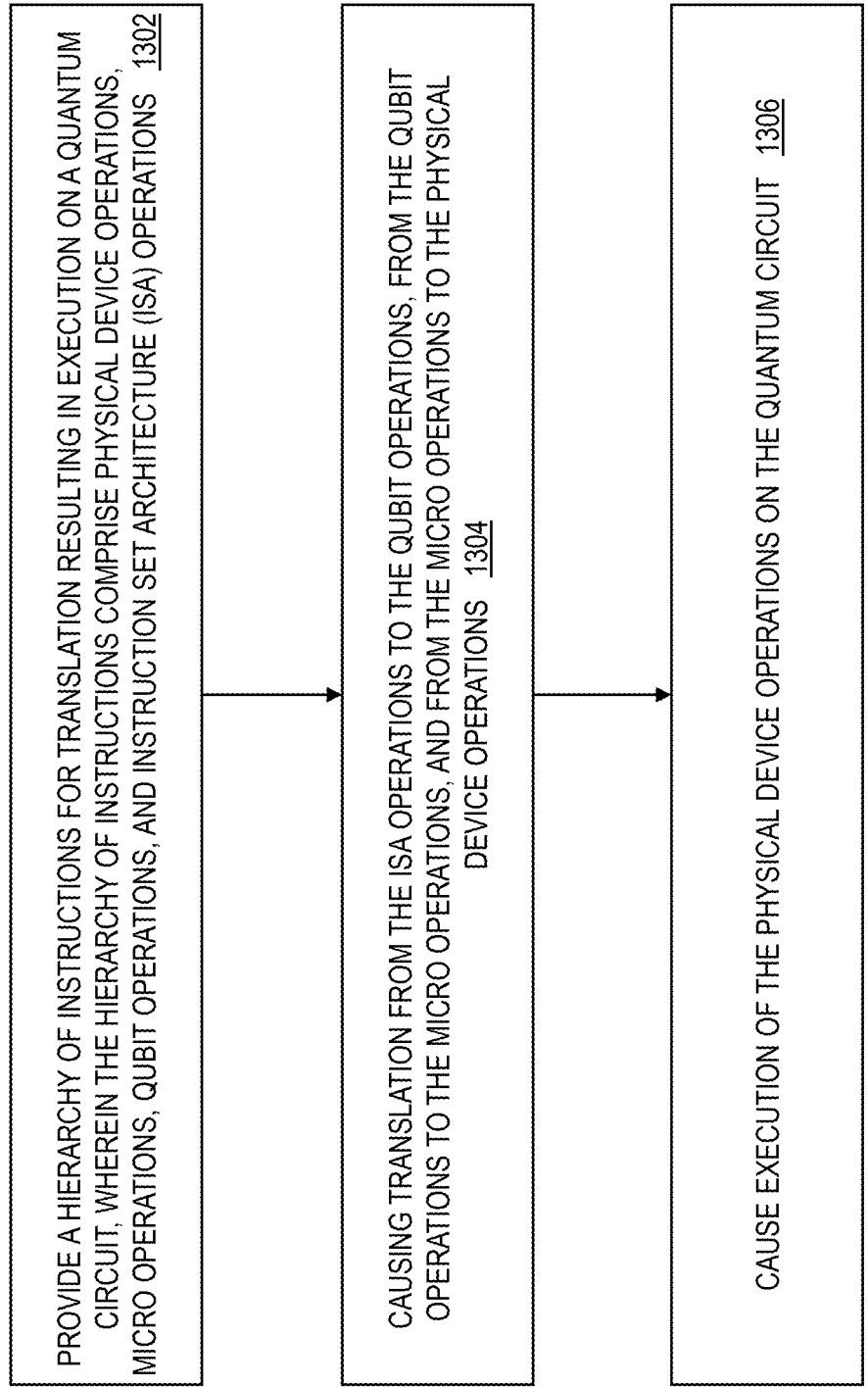
FIG. 13 is a flowchart of a computer-implemented method for translating instructions of a quantum instruction hierarchy to be levels of inputs on a quantum computer, executing the translated instructions/operations on quantum circuits, and outputting quantum measurements from the quantum circuit to a classical computer, in accordance with one or more embodiments.

FIG. 13 is a flowchart of a computer-implemented method 1300 for translating instructions of a quantum instruction hierarchy 90 to be levels of inputs on a quantum computer 10, executing the translated instructions/operations on quantum circuits 12 of the quantum computer 10, and outputting quantum measurements from the quantum circuit 12 to a classical computer 100, in accordance with one or more embodiments. Reference can be made to any of the figures.

At block 1302, the software 111 can cause execution a hierarchy of instructions (e.g., instruction hierarchy 90) (e.g., as the input 28) for translation resulting in execution on a quantum circuit 12, where the hierarchy of instructions (e.g., instruction hierarchy 90) comprise physical device operations of block 610, qubit micro operations of block 606, qubit operations of block 604, and instruction set architecture (ISA) operations of block 602 (e.g., quantum instruction set 150). At block 1304, as caused by the classical computer 100, the quantum computer 10 (e.g., instructions 24B executed on processor 20B) is configured to translate from the ISA operations of block 602 to the qubit operations of block 604, from the qubit operations of block 604 to the qubit micro operations of block 606, from the qubit micro operations of block 606 to the physical device operations of block 610. At block 1306, in response to the input 28 of the classical computer 100, the quantum computer 10 is caused to execute the physical device operations of block 608 on the quantum circuit 12.

The physical device operations of block 610 operate in parallel on physical qubits 14 on the quantum circuit 12. Software (e.g., quantum instruction set 150) issues instructions as the ISA operations. Each local ISA instruction execution of the ISA operations (e.g., of the quantum instruction set 150) corresponds to a fixed number of the qubit micro operations of block 606. The qubit micro operations of block 606 address (and execute on) patches (e.g., logical qubits) of physical qubits 14 on the quantum circuit 12.

One or more controllers (e.g., controllers 18A and 18B) are utilized to cause execution of the physical device operations of block 608, the qubit micro operations of block 606, and the qubit operations of block 604. Measurement outcomes (resulting) from the ISA operations of block 602 (that were sent to the quantum computer 10) are provided to a software (e.g., software 111) without exposing other measurement outcomes to the software (e.g., software 111) from the qubit operations of block 604, the qubit micro operations of block 606, and/or the physical device operations of block 610.

As technical effects and benefits, the quantum computer 10 is coupled to a hierarchy of instruction sets in the instruction hierarchy 90 that efficiently implements logical qubit operations, in accordance with one or more embodiments. This instruction hierarchy 90 targets practical-scale application executions that may include tens of operations, hundreds of operations, thousands of operations, millions of operations, billions of operations, and/or of hundreds of billions of operations. The instruction hierarchy 90 includes physical device operations of block 610, physical qubit operations of block 608, qubit micro operations of block 606, logical qubit operations of block 604, and instruction set architecture (ISA) operations of block 602.

As technical effects and benefits, this instruction hierarchy 90 reduces the bandwidth required for issuing operations from classical software such as software 111 and quantum instruction set 150 to quantum hardware such as the quantum circuit 12. The instruction hierarchy 90 also reduces the measurements from the quantum plane such as the quantum computer 10 to the classical plane such as the classical computer 100. Bandwidth in both directions is reduced by choosing the appropriate set of abstraction levels. In the top to bottom direction of the instruction hierarchy 90, software such as the quantum instruction set 150 issues instructions in terms of ISA operations. These ISA operations are expressed in terms of logical qubit operations in block 604 and broken down into qubit micro operations in block 606. The qubit micro operations in block 606 are broken down into physical device operations in block 610 that execute in parallel on a set of physical qubits 14. In this manner, the bandwidth requirements at each level are controlled in the instruction hierarchy 90, and this reduces the amount of inputs 28 from the classical computer 100 to the quantum computer 10. Similarly, in terms of measurement outcomes from qubits 14 of the quantum circuit 12, the stack of the instruction hierarchy 90 exposes only ISA-level measurements to software such as software 111 and/or quantum instruction set 150. Other measurements arising from the QEC implementation and low-level operations are handled lower down in the stack of the instruction hierarchy 90, which means that fewer rounds of outputs 30 need to be sent from the quantum computer 10 to the classical computer 100.

As technical effects and benefits, the instruction hierarchy 90 enables low-power, efficient instruction issue and decoding. Suppose one may wish to support a large number of ISA operations in order to provide a rich set of operations for the user, but implementing a complex instruction pipeline at milli-Kelvin temperatures will increase power consumption. Instead, the instruction hierarchy 90 of embodiments breaks down the instruction issue into stages. ISA level operations (e.g., block 602) from the quantum instruction set 150 of the classical computer 100 are first broken down into logical qubit operations (e.g., block 604) in the quantum computer 10. This could be accomplished in software (e.g., instructions 24B executed on the processor 20B) or hardware (e.g., logic circuits of the controller 18B). These logical qubit operations of block 604 can be translated into a set of qubit micro operations of block 606. These qubit micro operations can serve as the main target for the hardware stages of instruction issue. Having only a small number of micro operations of block 606 to decode allows the present disclosure to build a power-efficient issue pipeline at a warmer region of the stack (instead of placing it close to the physical qubits 14).

As technical effects and benefits, the instruction hierarchy 90 is structured and executed such that each operation has a fixed control footprint, i.e., a fixed number of micro operations of block 606 are issued for each ISA instruction execution of the quantum instruction set 150. Typical proposals for instructions for quantum computers include instructions that can (potentially) issue a varying number of micro operations depending on the instruction operands; this complicates microarchitecture design because either instruction cycle times may depend on operands or microarchitecture has to be overprovisioned to accommodate the worst case micro operation issue rates of instructions. To avoid this issue, one or more embodiments provide local instructions that have fixed number of qubit micro operations at block 606, irrespective of the operands or qubits that are addressed.

As technical effects and benefits, qubit micro operations of block 606 address patches (e.g., logical qubits) of physical qubits 14 rather than individual physical qubits 14 in a parallel SIMD-like fashion, rather than allow control over individual physical qubits 14, according to one or more embodiments. This kind of micro operation caters well to the standard mode of operation for practical-scale systems.

At any given instant, quantum algorithms of the quantum instruction set 150 may address only a subset of logical qubits. For example, a particular function call may address a well-defined subset of the system. In such cases, the remaining physical qubits 14 may be operating in an idle cycle. The instruction hierarchy 90 allows compression for the logical qubit operations of block 604 and qubit micro operations of block 606 in this case in order to further reduce bandwidth requirements. Similarly, when a subset of logical qubits requires a single type of operation, these operations and their micro operations of block 606 may be compressed into a smaller number of operations. Such compression can be achieved in software, with decompression in the lower layers of the stack, and/or can be implemented in hardware by introducing compressed instruction types.

In one or more embodiments, a set of micro operations of block 606 can be programmed and loaded into firmware in a software operation mode or implemented in the hardware.

Figure 11:
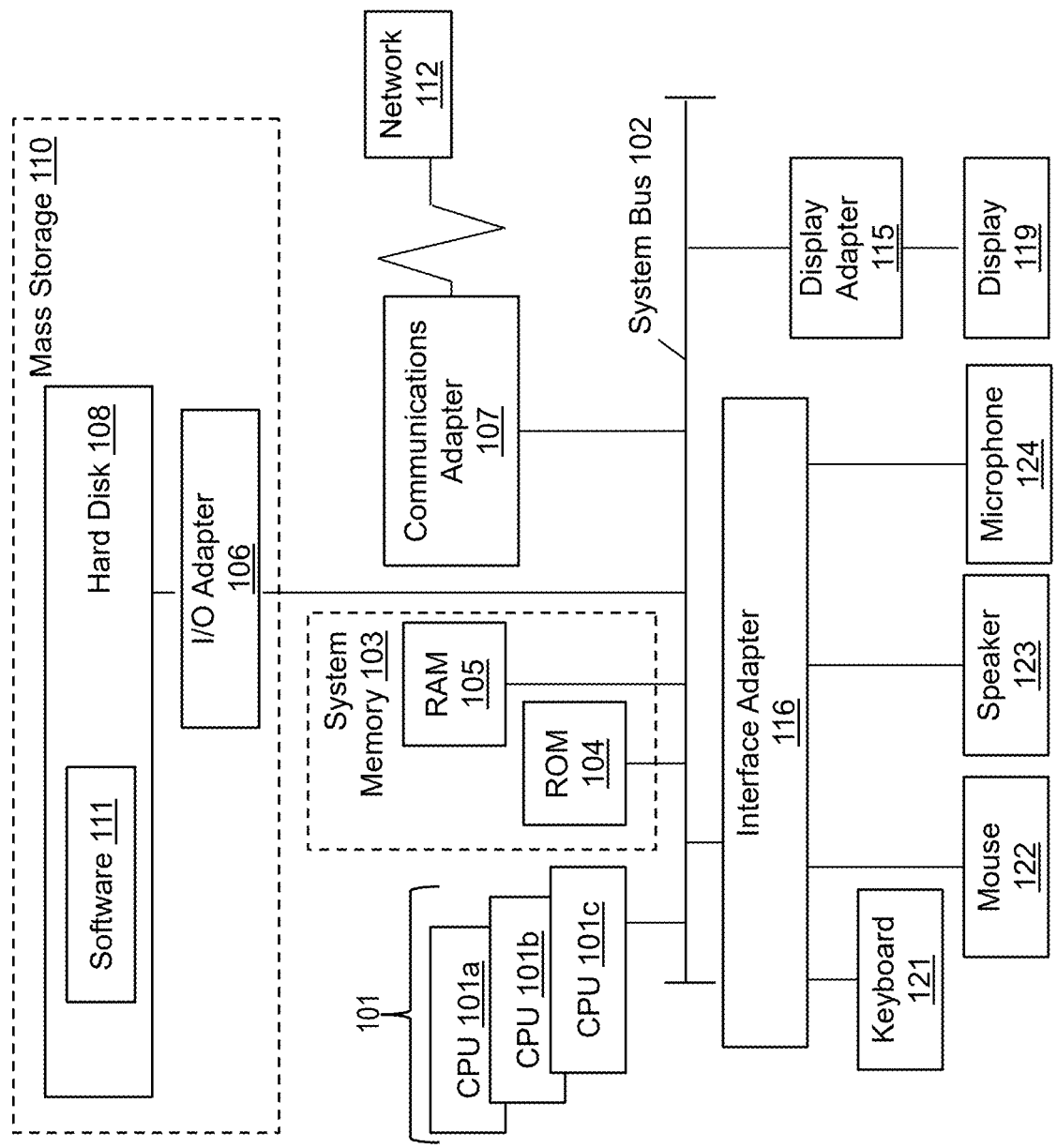
FIG. 11 depicts a block diagram of a classical computer system according to one or more embodiments.

Turning now to FIG. 11, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11 the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 11.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 11, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 11 is not intended to indicate that the computer system 100 is to include all of the components shown in FIG. 11. Rather, the computer system 100 can include any appropriate fewer or additional components not illustrated in FIG. 11 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the invention are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method comprising:
configuring a hierarchy of instructions resulting in execution on a quantum circuit, wherein the hierarchy of instructions comprise physical device operations, micro operations, qubit operations, and instruction set architecture (ISA) operations;
causing translation from the ISA operations to the qubit operations, from the qubit operations to the micro operations, and from the micro operations to the physical device operations, wherein the ISA operations comprise ISA instructions such that each ISA instruction corresponds to a fixed number of the micro operations independent of a number of physical qubits being addressed or a number of operands being specified by the each ISA instruction, thereby maintaining a fixed control footprint for each of the ISA operations; and
causing execution of the physical device operations on the quantum circuit.

2. The method of claim 1, wherein the physical device operations operate in parallel on the physical qubits on the quantum circuit.

3. The method of claim 1, wherein software issues instructions as the ISA operations.

4. The method of claim 1, wherein the micro operations address patches of the physical qubits on the quantum circuit.

5. The method of claim 1, wherein one or more controllers are utilized to cause execution of the physical device operations, the micro operations, and the qubit operations.

6. The method of claim 1, wherein measurement outcomes from the ISA operations are provided to a software without exposing other measurement outcomes to the software from the qubit operations, the micro operations, or the physical device operations.

7. A system having a memory, computer readable instructions, and one or more processors for executing the computer readable instructions, the computer readable instructions controlling the one or more processors to perform operations comprising:
configuring a hierarchy of instructions resulting in execution on a quantum circuit, wherein the hierarchy of instructions comprise physical device operations, micro operations, qubit operations, and instruction set architecture (ISA) operations;
causing translation from the ISA operations to the qubit operations, from the qubit operations to the micro operations, and from the micro operations to the physical device operations, wherein the ISA operations comprise ISA instructions such that each ISA instruction corresponds to a fixed number of the micro operations independent of a number of physical qubits being addressed or a number of operands being specified by the each ISA instruction, thereby maintaining a fixed control footprint for each of the ISA operations; and
causing execution of the physical device operations on the quantum circuit.

8. The system of claim 7, wherein the physical device operations operate in parallel on the physical qubits on the quantum circuit.

9. The system of claim 7, wherein software issues instructions as the ISA operations.

10. The system of claim 7, wherein the micro operations address patches of the physical qubits on the quantum circuit.

11. The system of claim 7, wherein one or more controllers are utilized to cause execution of the physical device operations, the micro operations, and the qubit operations.

12. The system of claim 7, wherein measurement outcomes from the ISA operations are provided to a software without exposing other measurement outcomes to the software from the qubit operations, the micro operations, or the physical device operations.

13. A system comprising:
a quantum circuit;
a computer coupled to the quantum circuit and comprising one or more processors controlled to perform operations comprising:
configuring a hierarchy of instructions resulting in execution on a quantum circuit, wherein the hierarchy of instructions comprise physical device operations, micro operations, qubit operations, and instruction set architecture (ISA) operations;
causing translation from the ISA operations to the qubit operations, from the qubit operations to the micro operations, and from the micro operations to the physical device operations, wherein the ISA operations comprise ISA instructions such that each ISA instruction corresponds to a fixed number of the micro operations independent of a number of physical qubits being addressed or a number of operands being specified by the each ISA instruction, thereby maintaining a fixed control footprint for each of the ISA operations; and
causing execution of the physical device operations on the quantum circuit.

14. The system of claim 13, wherein the physical device operations operate in parallel on the physical qubits on the quantum circuit.

15. The system of claim 13, wherein software issues instructions as the ISA operations.

16. The system of claim 13, wherein the micro operations address patches of the physical qubits on the quantum circuit.

17. The system of claim 13, wherein measurement outcomes from the ISA operations are provided to a software without exposing other measurement outcomes to the software from the qubit operations, the micro operations, or the physical device operations.

* * * * *